US012065964B1

(12) United States Patent
Terwilliger

(10) Patent No.: US 12,065,964 B1
(45) Date of Patent: Aug. 20, 2024

(54) BYPASS HEAT EXCHANGER CONFIGURATION TO REROUTE CORE FLOW

(71) Applicant: Raytheon Technologies Corporation, Farmington, CT (US)

(72) Inventor: Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/302,081

(22) Filed: Apr. 18, 2023

(51) Int. Cl.
*F02C 3/34* (2006.01)
*F02C 3/30* (2006.01)
*F02C 6/20* (2006.01)
*F02C 7/141* (2006.01)
*F02C 7/143* (2006.01)
*F02C 9/18* (2006.01)

(52) U.S. Cl.
CPC ............ *F02C 3/34* (2013.01); *F02C 3/30* (2013.01); *F02C 6/20* (2013.01); *F02C 7/141* (2013.01); *F02C 7/1435* (2013.01); *F02C 9/18* (2013.01); *F05D 2260/212* (2013.01); *F05D 2260/213* (2013.01)

(58) Field of Classification Search
CPC .... F02C 3/30; F02C 3/305; F02C 3/34; F02C 7/10; F02C 7/14; F02C 7/141; F02C 7/1435; F02C 1/08; F02K 1/10
See application file for complete search history.

(56) References Cited

U.S. PATENT DOCUMENTS

| | | | | |
|---|---|---|---|---|
| 3,799,249 A * | 3/1974 | Linhardt | ............... | F17C 9/02 261/153 |
| 6,622,470 B2 * | 9/2003 | Viteri | ............... | F02C 6/18 60/39.52 |
| 11,603,798 B1 * | 3/2023 | Terwilliger | ............... | F02C 7/18 |
| 11,635,022 B1 * | 4/2023 | Terwilliger | ............... | F02C 9/00 60/775 |
| 11,753,993 B1 * | 9/2023 | Terwilliger | ............... | F02C 3/22 60/266 |
| 2002/0023423 A1 * | 2/2002 | Viteri | ............... | F02C 6/18 60/39.182 |
| 2005/0236602 A1 * | 10/2005 | Viteri | ............... | F23L 7/005 252/372 |
| 2014/0360154 A1 * | 12/2014 | Benz | ............... | F02C 3/34 60/39.52 |
| 2016/0369695 A1 * | 12/2016 | Perlak | ............... | F02C 7/08 |
| 2018/0080375 A1 * | 3/2018 | Chen | ............... | H02K 7/1823 |
| 2020/0200085 A1 * | 6/2020 | Perlak | ............... | F02C 3/04 |
| 2021/0156308 A1 * | 5/2021 | Jones | ............... | F28D 21/0003 |
| 2021/0207500 A1 * | 7/2021 | Klingels | ............... | F01K 23/10 |
| 2023/0006221 A1 * | 1/2023 | Iwai | ............... | H01M 8/0432 |
| 2023/0286661 A1 * | 9/2023 | Klingels | ............... | B64D 29/06 |

* cited by examiner

Primary Examiner — Alain Chau
(74) Attorney, Agent, or Firm — Carlson, Gaskey & Olds, P.C.

(57) ABSTRACT

A turbine engine assembly includes a heat exchanger that is in thermal communication with an exhaust gas flow. A bypass passage is provided that is configured to selectively route at least a portion of the exhaust gas flow around the heat exchanger in response to a predefined engine operating condition.

13 Claims, 4 Drawing Sheets

BYPASS HEAT EXCHANGER CONFIGURATION TO REROUTE CORE FLOW

STATEMENT REGARDING FEDERALLY SPONSORED RESEARCH OR DEVELOPMENT

This invention was made with Government support under Contract DE-AR0001561 awarded by the United States Department of Energy, Office of ARPA-E. The Government has certain rights in this invention.

TECHNICAL FIELD

The present disclosure relates generally to an aircraft propulsion system that includes a steam generation system transforming recovered water into a steam flow injected into a core flow.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Some energy in the high energy exhaust flow is recovered as it is expanded through a turbine section. Steam injection can provide improved propulsive efficiencies. Water recovered from the high energy exhaust may be transformed into steam using the remaining thermal energy from the exhaust gas flow. Water recovery and steam generation utilize heat exchangers exposed to the high energy exhaust gas flows. Some engine operating conditions can result in exhaust gas flow temperatures that approach material and operation limits of the heat exchangers.

SUMMARY

A turbine engine assembly according to an exemplary embodiment of this disclosure, among other possible things includes, a compressor section where an inlet airflow is compressed, a combustor section where the compressed inlet airflow is mixed with fuel and ignited to generate an exhaust gas flow, a turbine section through which the exhaust gas flow expands to generate a mechanical power output, at least one heat exchanger that is in thermal communication with the exhaust gas flow, and a bypass passage that is configured to selectively route at least a portion of the exhaust gas flow around the at least one heat exchanger in response to a predefined engine operating condition.

In a further embodiment of the foregoing turbine engine, the at least one heat exchanger includes at least one of a condenser where water is extracted from the exhaust gas flow and an evaporator system.

In a further embodiment of any of the foregoing turbine engines, the evaporator is configured to use thermal energy from the exhaust gas flow to generate a steam flow from at least a portion of water that is extracted by the condenser for injection into a core flow path.

In a further embodiment of any of the foregoing, the turbine engine includes a flow control device that is operated by a controller. The controller is configured to control an amount of available water and to control the flow control device to selectively direct the exhaust gas flow into the bypass passage based, at least in part, on information indicative of an amount of available water.

In a further embodiment of any of the foregoing, the turbine engine includes a flow control device that is operated by a controller for selectively directing the exhaust gas flow into the bypass passage and a sensor assembly that communicates information indicative of a temperature of the at least one heat exchanger.

In a further embodiment of any of the foregoing turbine engines, the predefined engine operating condition is a temperature and the controller is programmed to operate the flow control device to route exhaust gas flow into the bypass passage that is responsive to a sensed temperature of the at least one heat exchanger that exceeds a predefined threshold temperature.

In a further embodiment of any of the foregoing turbine engines, the controller is programmed to operate the flow control device to close the bypass passage such that the exhaust gas flow is directed through the at least one heat exchanger in response to the sensed temperature returning below the predefined threshold temperature.

In a further embodiment of any of the foregoing turbine engines, only a portion of the exhaust gas flow is routed into the bypass passage.

In a further embodiment of any of the foregoing turbine engines, the bypass passage includes an outlet to exhaust bypassed exhaust gas flow to the ambient environment.

An aircraft propulsion system according to another exemplary embodiment of this disclosure, among other possible things includes, a core engine section that generates an exhaust gas flow, a propulsor that is driven by the core engine, a condenser where water is extracted from the exhaust gas flow, an evaporator system where thermal energy from the exhaust gas flow is utilized to generate a steam flow from at least a portion of water that is extracted by the condenser for injection into the core engine, and a bypass passage that is configured to selectively route at least a portion of the exhaust gas flow around at least one of the evaporator and the condenser in response to a predefined engine operating condition.

In a further embodiment of the foregoing, the aircraft propulsion system includes a flow control device that is operated by a controller for selectively directing the exhaust gas flow into the bypass passage.

In a further embodiment of any of the foregoing, the aircraft propulsion system includes a sensor assembly that communicates information indicative of a temperature of at least one of the condenser or the evaporator system to the controller.

In a further embodiment of any of the foregoing aircraft propulsion systems, the predefined engine operating condition is a temperature and the controller is programmed to operate the flow control device to route exhaust gas flow into the bypass passage that is responsive to a sensed temperature of at least one of the condenser or the evaporator system that exceeds a predefined threshold temperature.

In a further embodiment of any of the foregoing aircraft propulsion systems, the controller is programmed to operate the flow control device to close the bypass passage such that the exhaust gas flow is directed through the evaporator system and the condenser in response to the sensed temperature being below the predefined threshold temperature.

A method of operating an aircraft propulsion system, the method, according to an exemplary embodiment of this disclosure, among other possible things includes, generating an exhaust gas flow, measuring an engine operating parameter that is indicative of a temperature of at least one of a condenser where water is extracted from the exhaust gas flow and an evaporator where thermal energy from the exhaust gas flow is utilized to generate a steam flow from at least a portion of water that is extracted by the condenser, and selectively routing at least, a portion of the exhaust gas flow around one or both of the condenser and the evaporator in response to the measured engine operating parameter being indicative of a temperature exceeding a predefined threshold.

In a further embodiment of the foregoing, the method includes selectively operating a flow control device to selectively direct the exhaust gas flow into a bypass passage.

In a further embodiment of any of the foregoing, the method includes selectively operating the flow control device to direct the exhaust gas flow through the evaporator system and the condenser in response to the measured engine operating parameter being indicative of the temperature being below the predefined threshold temperature.

In a further embodiment of any of the foregoing, the method further includes directing exhaust gas flow through the evaporator and the condenser in response to a predefined amount of water being communicated to the evaporator.

In a further embodiment of any of the foregoing, the method includes selectively routing at least a portion of the exhaust gas flow around one or both of the condenser and the evaporator includes routing exhaust gas flow around the condenser.

In a further embodiment of any of the foregoing, the method includes selectively routing at least a portion of the exhaust gas flow around one or both of the condenser and the evaporator includes routing the exhaust gas flow around both the condenser and the evaporator.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
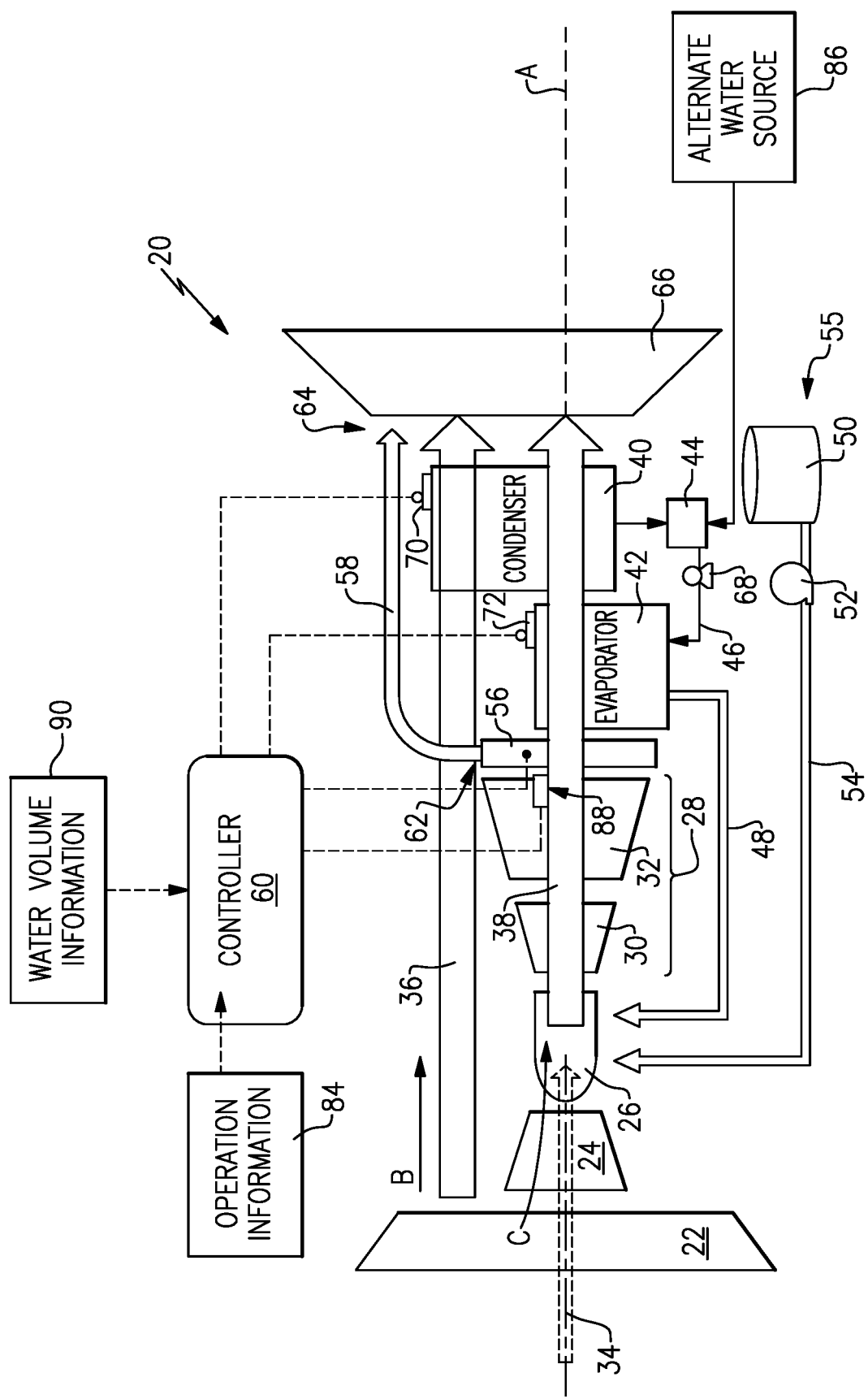
FIG. 1 is a schematic view of an example aircraft propulsion system embodiment in a first operating condition.

FIG. 1 schematically illustrates an example propulsion system 20 that includes a bypass passage 58 for routing exhaust gas flow around heat exchangers of a condenser 40 and an evaporator system 42. The bypass passage 58 provides for rerouting of an exhaust gas flow 38 during engine operating conditions where temperatures exceed predefined temperature limits of the condenser 40 and/or the evaporator system 42.

The engine 20 includes a fan section 22, a compressor section 24, a combustor section 26 and the turbine section 28 disposed along an engine longitudinal axis A. The example turbine section 28 includes a high pressure turbine (HPT) 30 and a low pressure turbine (LPT) 32. The fan section 22 drives inlet airflow 34 along a bypass flow path B, while the compressor section 24 draws air in along a core flow path C. The inlet airflow 34 is compressed and communicated to a combustor section 26 where the compressed core airflow 34 is mixed with a fuel flow 54 and ignited to generate the high energy combusted exhaust gas flow 38. The exhaust gas flow 38 expands through the turbine section 28 where energy is extracted and utilized to drive the fan section 22 and the compressor section 24.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 55 including at least a fuel tank 50 and a fuel pump 52 provide a fuel flow 54 to the combustor 26. The example fuel system 55 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon-based fuels and/or sustainable aviation fuels.

An evaporator system 42 and condenser 40 are disposed downstream of the turbine section 28 and receive the exhaust gas flow 38. The example evaporator system 42 utilizes thermal energy from the exhaust gas flow 38 to generate a steam flow 48 from a water flow 46 extracted by the condenser 40. The condenser 40 cools the exhaust gas flow 38 to extract water that is gathered in a tank 44 and pressurized by a pump 68 for communication of the water flow 46 to the evaporator system 42. In one disclosed example, a bypass flow 36 is utilized to cool the exhaust gas flow 38 in the condenser 40. Other cold sink flows and systems may be utilized to cool the exhaust gas flow 38 within the condenser 40 and are within the contemplation and scope of this disclosure.

The steam flow 48 from the evaporator is communicated to the combustor 26 and combined with the exhaust gas flow 38 to increase mass flow through the turbine section 28 and thereby increases engine power and efficiency. The engine 20 has an increased power output from the injected steam 48 due to an increasing mass flow through the turbine section 28 without a corresponding increase in work from the compressor section 24. Although the steam flow 48 is shown as being injected into the combustor 26, the steam flow 48 may be injected at other locations along the core flow path C.

The condenser 40 and the evaporator system 42 are heat exchangers that are exposed to the high temperatures of the high energy exhaust gas flow 38. During typical engine operating conditions, the temperatures at each of the condenser and evaporator system 42 are within defined operating ranges. However, engine operating conditions at higher ambient temperatures or different operating settings may increase temperatures of the gas flow 38 and thereby the condenser 40 and evaporator system 42. Such higher temperature may approach predefined operating limits of the condenser 40 and the evaporator system 42. The example engine 20 includes a bypass passage 58 for selectively routing at least a portion of the exhaust gas flow 38 around the condenser 40 and evaporator system 42. In one example embodiment, the exhaust gas flow 38 is routed to an outlet 64 and through the nozzle 66.

Although the heat exchangers are disclosed by way of example as the condenser 40 and the evaporator system 42, other heat exchangers that are in thermal communication with the exhaust gas flow may benefit from the selective bypass of the exhaust gas flow and are within the contemplation of this disclosure. For example, heat exchangers utilized for capture of waste heat in a bottoming energy recovery cycle may benefit from this disclosure. Moreover, the evaporator system 42 may include additional heat exchangers upstream of the bypass passage 58. For example, a superheater may be provided to further heat the steam flow 48 upstream of the bypass passage 58.

In one example embodiment, a flow control device 56 is disposed after the turbine section 28 and before the evaporator system 42. The flow control device 56 is configured to direct the exhaust gas flow 38 through an inlet 62 and the bypass passage 58 to the outlet 64, bypassing the condenser 40 and evaporator system 42. Rerouting of the exhaust gas flow 38 prevents exposure to gas flows above predefined temperatures. The example flow control device 56 is shown schematically and may include any ducting, actuators, and structure necessary for routing flow into the bypass passage 58. Moreover, the example flow control device 56 may be a variable device for routing only a portion of the exhaust flow 38 into the bypass passage 58.

A controller 60 is provided and programmed to operate the flow control device 56 based on information from at least one sensor assembly. In one example embodiment, a first sensor assembly 70 provides information indicative of a temperature at the condenser 40. A second sensor assembly 72 is associated with the evaporator system 42. The flow control device 56 is operable by the controller 60 to selectively divert the exhaust gas flow 38 through the bypass passage 58 based on sensed temperatures in at least one of the condenser 40 and the evaporator system 42 exceeding a predefined threshold temperature. In one example embodiment, the threshold temperature is determined based on the material and structural capability of the condenser 40 and evaporator system 42.

The controller 60 may also be programmed to control an amount of available water either stored in the storage tank 44 or generated by the condenser 40. The controller 60 is programed to operate the flow control device 56 to selectively direct the exhaust gas flow 38 into the bypass passage 58 based, at least in part, on information indicative of a volume/amount of available water, indicated schematically at 90. Information indicative of the volume of water 90 may be obtained from sensors located within the tank 44 or through the use of other engine information. Moreover, the controller 60 may be programmed to obtain additional water from an alternate water source 86 when the available water is below a predefined threshold amount.

Moreover, other predefined engine operating conditions could be utilized to trigger bypass of the gas flow 38. The example engine operating condition is a temperature at the condenser 40 and/or the evaporator system 42. In another example embodiment, the operating condition may include any one or a combination of pressure, temperature, power settings, shaft speed and any other one or combination of monitored engine operating conditions. In another example embodiment, the controller 60 is programmed to operate the flow control device 56 based on operation information, indicated schematically at 84, provided to the controller 60. The operation information 84 can include monitored engine parameters such as shaft speeds, pressures, and temperatures in other locations of the engine 20. Moreover, the operation information 84 may include any other operational information gathered during engine operation, including, for example, ambient temperature and altitude.

The example controller 60 is a device and system for performing necessary computing or calculation operations. The example controller 60 may be specially constructed for this purpose, or it may comprise at least a general-purpose computer selectively activated or reconfigured by a computer program stored in the computer. The controller 60 may be a dedicated controller, or part of an engine controller or aircraft controller.

The controller 60 may include a computer program directing operation. Such a computer program and also data required for its execution may be stored in a computer readable storage medium, such as, but is not limited to, any type of disk, optical disks, CD-ROMs, magnetic-optical disks, read-only memories (ROMs), random access memories (RAMS), EPROMS, EEPROMs, magnetic or optical cards, application specific integrated circuits (ASICs), or any type of media suitable for storing electronic instructions, and each coupled to a computer system bus. Furthermore, the computer system may include a single processor or architectures employing multiple processors designed for increased computing capability.

Figure 2:
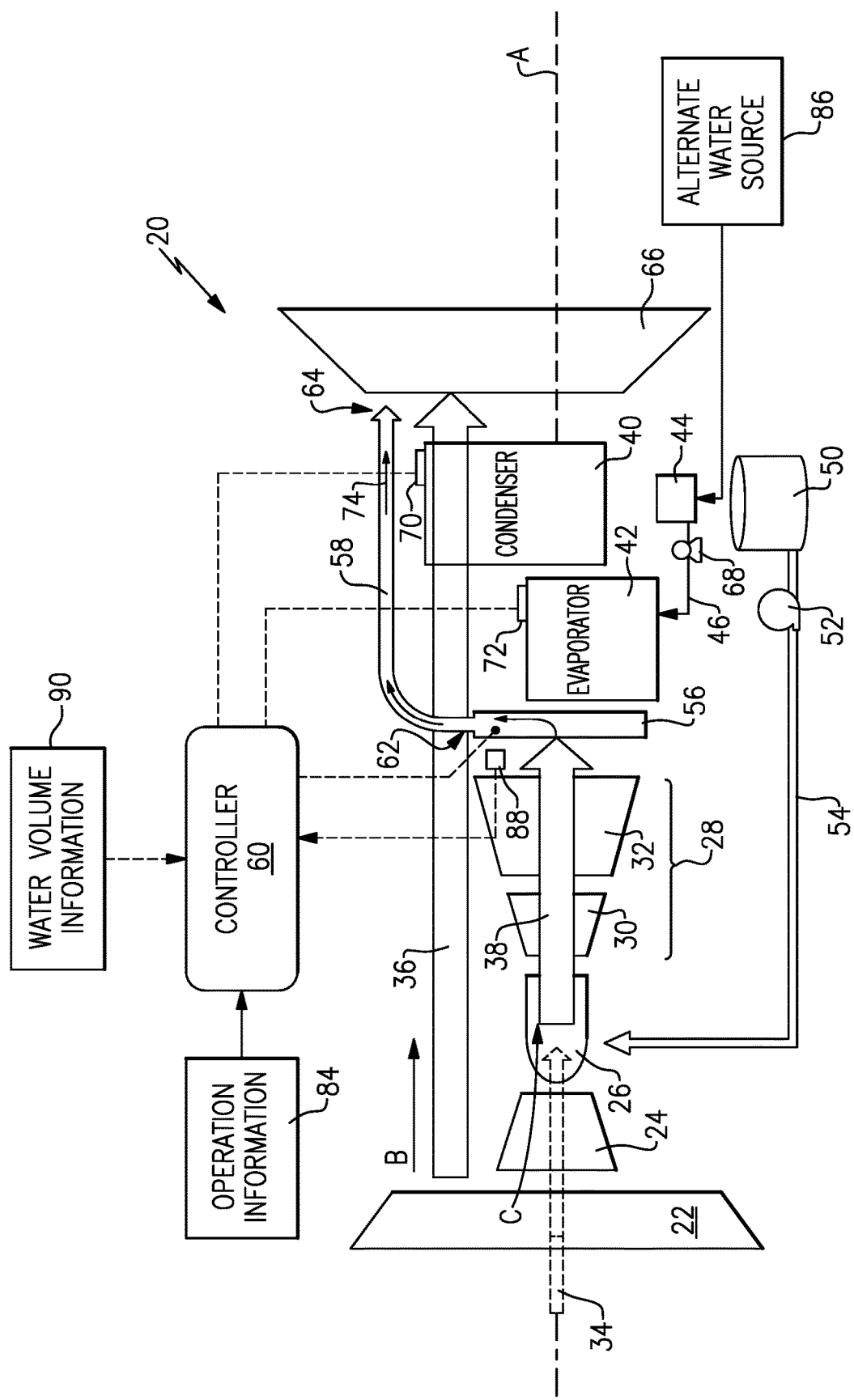
FIG. 2 is a schematic view of the example aircraft propulsion system embodiment of FIG. 1 in a second operating condition.

Referring to FIG. 2, the example engine 20 is shown in an operating condition where all of the exhaust gas flow 38 is routed through the bypass passage 58. The flow control device 56 is opened to direct the exhaust gas flow 38 through the inlet 62 and into the bypass passage 58. The bypassed exhaust gas flow 74 is exhausted through the outlet 64 and through the nozzle 66 into the ambient environment.

The gas flow 38 will remain diverted until the temperature of the gas flow 38 falls back below the predefined threshold value. The condenser 40 and evaporator system 42 will cool in the absence of the gas flow 38 and therefore a temperature other than that of the condenser 40 and evaporator system 42 is utilized. In one example embodiment, a temperature sensor assembly 88 is provided to obtain information indicative of a temperature of the exhaust gas flow 38 near the flow control device 56. The example sensor assembly 88 is shown schematically and may not be disposed directly within the exhaust flow 38, but instead associated with a structure that provides for obtaining information that is indicative of the gas flow 38. Other locations for the sensor assembly and information can be utilized to determine when the exhaust gas flow 38 is at a temperature that is within an acceptable range to close the flow control device 56 and reengage gas flows through the evaporator system 42 and the condenser 40.

As shown in FIG. 2, the evaporator system 42 and condenser 40 are no longer exposed to the gas flow 38 and therefore are not exposed to temperatures that exceed the predefined threshold value. However, the absence of the exhaust gas flow 38 through the condenser 40 stops the extraction of water and thereby the generation of the steam flow 48 (FIG. 1). Accordingly, an alternate water source 86 may be in communication with the water tank 44 to provide a quantity of water needed to continue or restart steam generation. The alternate water source 86 may be a storage tank or water producing device onboard the aircraft, such as, for example, a fuel cell.

Figure 3:
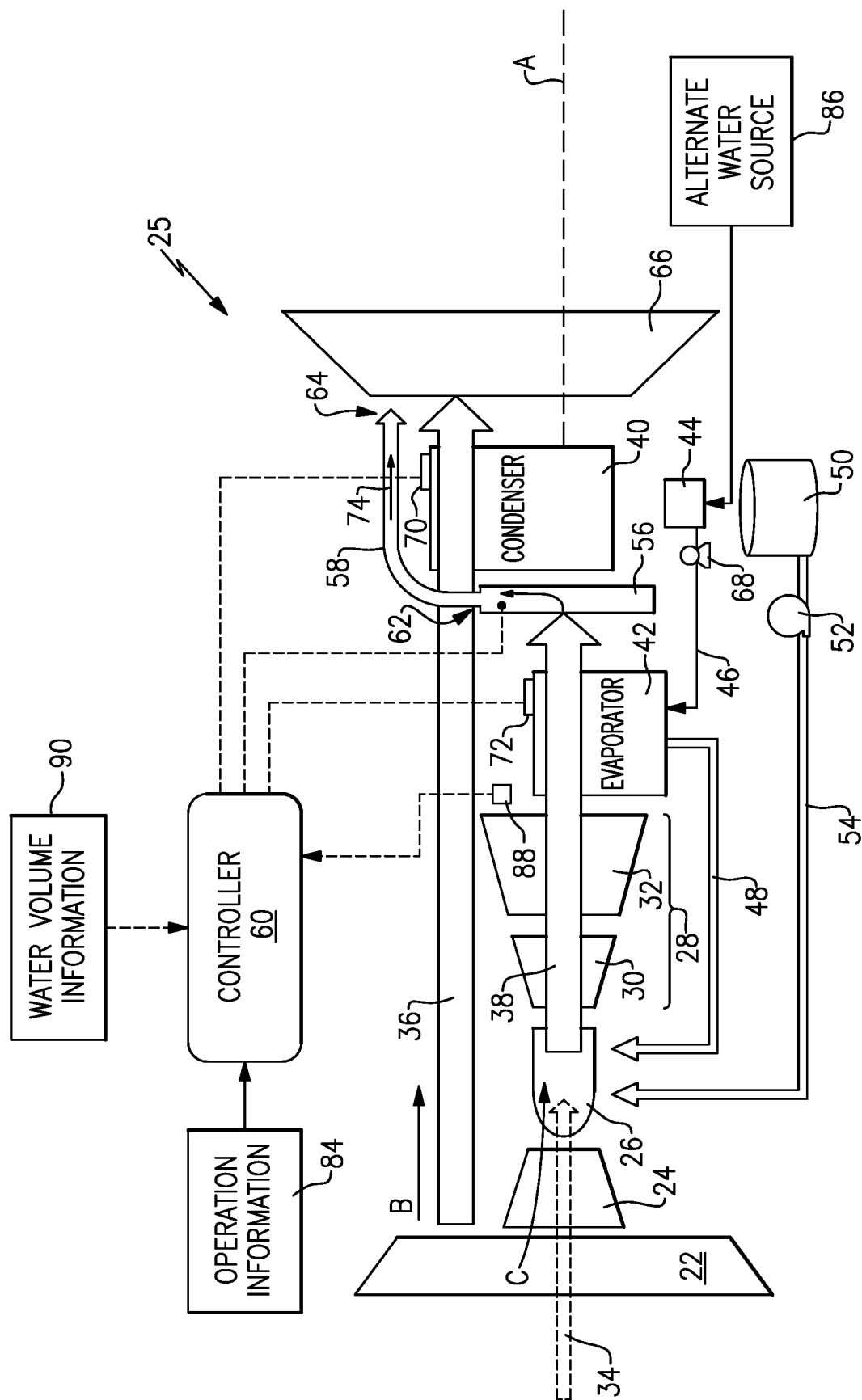
FIG. 3 is a schematic view of another example aircraft propulsion system embodiment.

Referring to FIG. 3, another example engine assembly 25 is shown by way of example and includes the flow control device 56 disposed before the condenser 40. Accordingly, in this example embodiment, the gas flow 38 is permitted to pass through the evaporator system 42 and is diverted before it reaches the condenser 40. Because the condenser 40 is downstream of the evaporator system 42, the exhaust gas flow 38 at the condenser 40 is typically much cooler than at the evaporator system 42. Additionally, the condenser 40 is in thermal communication with the bypass flow 36 and thereby cooler. Accordingly, the condenser 40 may be constructed of materials with a lesser temperature capability as compared to the evaporator system 42. Therefore, the flow control device 56 is arranged to protect the condenser 40 from high temperatures by diverting flow into the bypass passage 58.

The alternate water source 86 may continue supplying water to the tank 44 to enable continued production of the steam flow 48 in the evaporator system 42.

Figure 4:
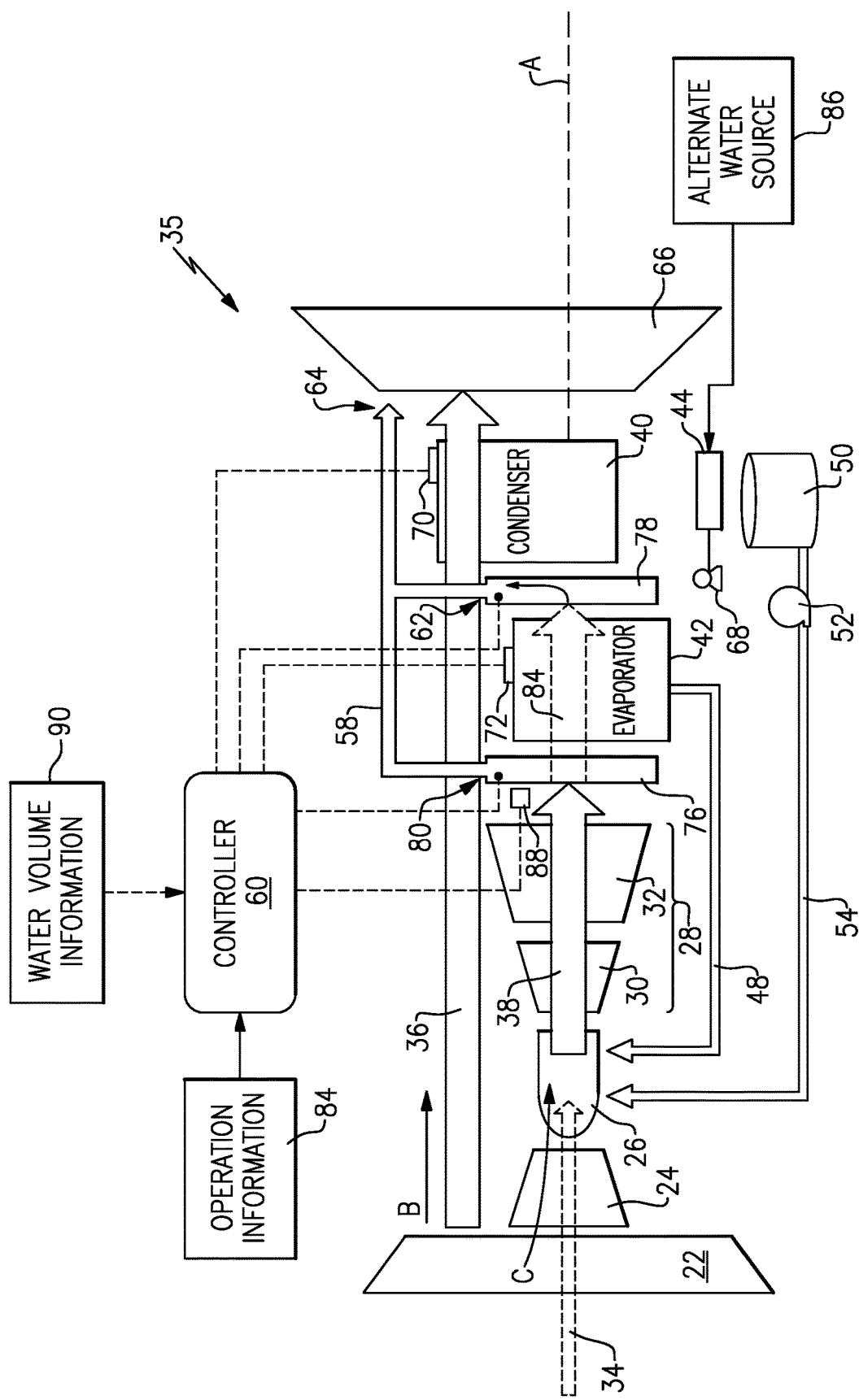
FIG. 4 is a schematic view of another example aircraft propulsion system.

Referring to FIG. 4, another example engine embodiment is schematically shown and indicated at 35. The engine 35 includes a first flow control device 76 and a second flow control device 78. The first flow control device 76 is disposed before the evaporator system 42 and the second flow control device is disposed before the condenser 40. Each of the flow control devices includes an inlet 80, 82 for directing gas flow 38 into the bypass passage 58. The two flow control devices 76, 78 provide for tailoring of bypass flow to engine operating conditions. In some engine operating conditions, only the second flow control device 78 is actuated to divert gas flow around the condenser 40. In other engine operating conditions, the first flow control device 76 is actuated to divert gas flow 38 around both the evaporator system 42 and the condenser 40.

In one disclosed operational embodiment, the first flow control device 76 is closed and gas flow 84 through the evaporator system 42 is diverted into the bypass passage 58 at the second flow control device 78. During operation with the first flow control device 76 closed, the evaporator system 42 may continue generating the steam flow 48 with water from the alternate water source 86. Exhaust gases are bypassed around the condenser 40 until cooled to a temperature compatible with condenser operation 40. The compatible temperature may be based on material threshold of the condenser 40 or other operating requirements. The inclusion of the first and second flow control devices 76, 78 provides for the ability of the controller 62 to tailor operation to current engine and aircraft operating conditions.

Accordingly, the example engine embodiments provide protection of the evaporator and condenser from temperatures that exceed predefined operating temperature limits of the exhaust gas flow with a bypass passage configured to selectively route at least a portion of the exhaust gas flow around at least one of the evaporator and the condenser.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
   a compressor section where an inlet airflow is compressed;
   a combustor section where the compressed inlet airflow is mixed with fuel and ignited to generate an exhaust gas flow;
   a turbine section through which the exhaust gas flow expands to generate a mechanical power output;
   a condenser where water is extracted from the exhaust gas flow;
   an evaporator in thermal communication with the exhaust gas flow and configured to use thermal energy from the exhaust gas flow to generate a steam flow from at least a portion of water extracted by the condenser for injection into a core flow path;
   a bypass passage configured to selectively route at least a portion of the exhaust gas flow around at least one of the condenser and the evaporator in response to a predefined temperature indicative of a temperature at the at least one of the condenser and the evaporator; and
   a flow control device operated by a controller, wherein the controller is configured to control an amount of available water and to control the flow control device to selectively direct the exhaust gas flow into the bypass passage based, at least in part, on information indicative of an amount of available water.

2. The turbine engine assembly as recited in claim 1, including a sensor assembly communicating information indicative of a temperature at least one of the condenser and the evaporator to the controller.

3. The turbine engine assembly as recited in claim 2, wherein the controller is programmed to operate the flow control device to route the exhaust gas flow into the bypass passage responsive to a sensed temperature of the at least one the condenser and the evaporator exceeding a predefined threshold temperature.

4. The turbine engine assembly as recited in claim 3, wherein the controller is programmed to operate the flow control device to close the bypass passage such that the exhaust gas flow is directed through the at least one of the condenser and the evaporator in response to the sensed temperature returning below the predefined threshold temperature.

5. The turbine engine as recited in claim 1, wherein only a portion of the exhaust gas flow is routed into the bypass passage.

6. The turbine engine as recited in claim 1, wherein the bypass passage includes an outlet to exhaust bypassed exhaust gas flow to the ambient environment.

7. An aircraft propulsion system comprising:
   a core engine section generating an exhaust gas flow;
   a propulsor driven by the core engine;
   a condenser where water is extracted from the exhaust gas flow;
   an evaporator system where thermal energy from the exhaust gas flow is utilized to generate a steam flow from at least a portion of water extracted by the condenser for injection into the core engine; and
   a bypass passage configured to selectively route at least a portion of the exhaust gas flow around at least one of the evaporator and the condenser in response to a predefined engine operating condition;
   a flow control device operable for selectively directing the exhaust gas flow into the bypass passage; and
   a controller programmed to operate the flow control device based on information indicative of an amount of water available for communication to the evaporator.

8. The aircraft propulsion system as recited in claim 7, including a sensor assembly communicating information indicative of a temperature of at least one of the condenser or the evaporator system to the controller.

9. The aircraft propulsion system as recited in claim 8, wherein the predefined engine operating condition is a temperature and the controller is programmed to operate the flow control device to route exhaust gas flow into the bypass passage responsive to a sensed temperature of at least one of the condenser or the evaporator system exceeding a predefined threshold temperature.

10. The aircraft propulsion system as recited in claim 9, wherein the controller is programmed to operate the flow control device to close the bypass passage such that the exhaust gas flow is directed through the evaporator system and the condenser in response to the sensed temperature being below the predefined threshold temperature.

11. A method of operating an aircraft propulsion system, the method comprising:

generating an exhaust gas flow;

measuring an engine operating parameter indicative of a temperature of at least one of a condenser where water is extracted from the exhaust gas flow and an evaporator where thermal energy from the exhaust gas flow is utilized to generate a steam flow from at least a portion of water extracted by the condenser;

selectively operating a flow control device to selectively direct at least a portion of the exhaust gas flow around one or both of the condenser and the evaporator into a bypass passage in response to the measured engine operating parameter being indicative of a temperature exceeding a predefined threshold;

selectively operating the flow control device to direct the exhaust gas flow through the evaporator system and the condenser in response to the measured engine operating parameter being indicative of the temperature being below the predefined threshold temperature and directing exhaust gas flow through the evaporator and the condenser in response to a predefined amount of water being communicated to the evaporator.

12. The method as recited in claim 11, wherein selectively routing at least a portion of the exhaust gas flow around one or both of the condenser and the evaporator comprises routing exhaust gas flow around the condenser.

13. The method as recited in claim 11, wherein selectively routing at least a portion of the exhaust gas flow around one or both of the condenser and the evaporator comprises routing the exhaust gas flow around both the condenser and the evaporator.

* * * * *